United States Patent [19]
Adkins et al.

[11] Patent Number: 5,788,264
[45] Date of Patent: Aug. 4, 1998

[54] ANTI-ROLL BAR ASSEMBLIES FOR ROAD VEHICLES

[75] Inventors: David Paul Adkins, Coventry; Robert David Povey, Redditch; Trevor John Griffiths, Allesley, all of United Kingdom

[73] Assignee: Jaguar Cars, Ltd., Dearborn, Mich.

[21] Appl. No.: 738,958

[22] Filed: Oct. 24, 1996

[30] Foreign Application Priority Data

Oct. 25, 1995 [GB] United Kingdom ............ 9521852

[51] Int. Cl.⁶ ........................................ B60G 21/00
[52] U.S. Cl. ............................... 280/689; 280/723
[58] Field of Search ............................ 280/689, 723

[56] References Cited

U.S. PATENT DOCUMENTS

| | | | |
|---|---|---|---|
| 2,915,321 | 12/1959 | Wilfert | 280/721 |
| 3,033,587 | 5/1962 | Perish | 280/665 |
| 3,922,040 | 11/1975 | Carter | 384/209 |
| 4,203,615 | 5/1980 | Cislo et al. | 280/689 |

FOREIGN PATENT DOCUMENTS

| | | |
|---|---|---|
| A-0044579 | 1/1982 | European Pat. Off. . |
| A-0228232 | 7/1987 | European Pat. Off. . |
| E-66483 | 3/1957 | France . |
| A-2353409 | 12/1977 | France . |
| A-2466358 | 4/1981 | France . |
| A-2160022 | 6/1973 | Germany . |
| A-2102814 | 7/1990 | Japan . |
| A-3276812 | 3/1992 | Japan . |
| A-223418 | 8/1995 | Japan . |
| 2010759 | 7/1979 | United Kingdom . |
| 2030089 | 4/1980 | United Kingdom . |
| A-9413967 | 6/1994 | WIPO . |

*Primary Examiner*—Kenneth R. Rice
*Attorney, Agent, or Firm*—Gregory P. Brown

[57] ABSTRACT

An anti-roll bar assembly suitable for use in motor vehicles is mounted with respect to a cross beam (24) by means of bearings (30) which engage longitudinally extending portions of the anti-roll bar (12). The bearings (30) engage the first and second end portions (16) of an anti-roll bar intermediate first and second free ends (18) of the end portions (16) and a central portion (14) of the anti-roll bar (12). The bearings (30) fall on a common axis transverse to a longitudinal axis of the motor vehicle and permit adjustment transverse to the longitudinal axis of the vehicle to accommodate tolerance build up in manufacture of the motor vehicle.

12 Claims, 3 Drawing Sheets

5,788,264

1

ANTI-ROLL BAR ASSEMBLIES FOR ROAD VEHICLES

BACKGROUND OF THE INVENTION

1. Field of the Invention

The present invention relates to anti-roll bar assemblies for road vehicles.

2. Disclosure Information

In conventional road vehicles, it is normal practice to interconnect the suspensions of the wheels on a common axle by means of an anti-roll bar, which works in torsion to restrict relative vertical movement of the wheels, thereby reducing the roll of the vehicle, particularly on cornering.

Conventional anti-roll bars have a pair of end portions one connected to each wheel of the vehicle, the end portions extending substantially longitudinally of the vehicle and being connected by a central portion extending transversely of the longitudinal axis of the vehicle. The anti-roll bar is mounted to the vehicle by means of one or more compliant mountings which engage the central transverse portion of the bar. The anti-roll bar is thereby permitted to rotate freely about the axis of its central portion.

With conventional anti-roll bars, because of space constraints, it is possible that the longitudinally extending portions of the bar are of a significant length. In order to prevent flexing of these longitudinal extending portions, the bar has to be of a substantial cross-section with consequent weight penalties.

The present invention provides a modified anti-roll bar assembly which will permit a reduction in the diameter of the bar that may be used, with a consequent weight saving.

SUMMARY OF THE INVENTION

According to one aspect of the present invention an anti-roll bar assembly for a motor vehicle comprises; an anti-roll bar with a pair of end portions interconnected by a central portion. Each of the end portions extends substantially longitudinally of the vehicle and is connected at its free end to one of a pair of wheels mounted on a common axle of the vehicle. The central portion of the bar extends transversely to the longitudinal axis of the vehicle. Each of the end portions of the anti-roll bar is mounted intermediate of its free end and the central portion of the bar, with respect to the vehicle by means of a bearing assembly. The bearing assemblies are mounted on a common axis transverse to the longitudinal axis of the vehicle to permit pivotal movement of the end portions of the anti-roll bar about the common axis.

With the above described assembly, when the suspensions of the wheels are moving up or down together, the bearing assemblies will permit the bar to pivot about the common transverse axis. However, differential movement of the wheels will be opposed by torsion of the anti-roll bar and also flexing of the portions of the bar between the bearings and the wheels. As the bar is mounted part way along the longitudinally extending end portions of the bar, the length between the supported part of the bar and the wheel may be reduced, so that the diameter of the bar and thus its weight may also be reduced.

According to a preferred embodiment of the invention, means is provided to permit adjustment of the position of the bearing transverse to the longitudinal axis of the vehicle, in order to accommodate tolerance build up in the support structure of the vehicle to which the bearings are secured.

2

According to a further preferred embodiment, the anti-roll bar is mounted by means of spherical bearings.

BRIEF DESCRIPTION OF THE DRAWINGS

FIG. 6 is a sectional side elevation of an alternative form of bearing for use in the assembly illustrated in FIG. 1.

DETAILED DESCRIPTION OF PREFERRED EMBODIMENTS

Figure 1:
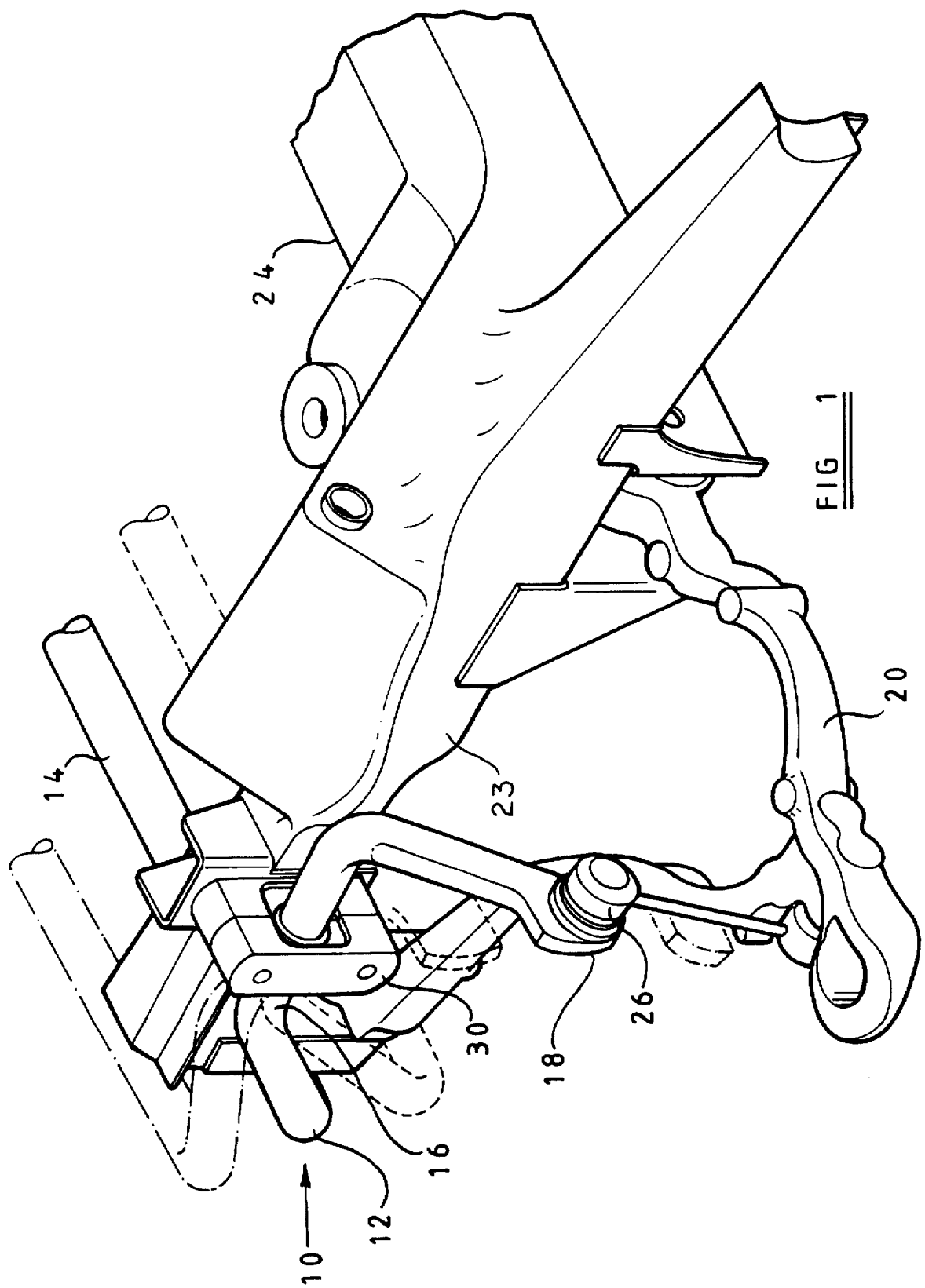
FIG. 1 is an isometric view of one side of an anti-roll bar assembly in accordance with the present invention.

FIG. 1 shows one side of an anti-roll bar assembly 10, the other side being a mirror image of that shown. The anti-roll bar assembly 10 comprises an anti-roll bar 12 having a central portion 14 which extends transversely of a longitudinal axis of the vehicle. An end portion 16 is provided at each end of the central portion 14, the end portion 16 extending longitudinally of the vehicle.

The free end 18 of each end portion 16 is connected to a suspension arm 20 of one of the wheels on a common axle of the vehicle. The suspension arms 20 are pivotally mounted to opposite sides of a cross beam 24 which is secured transversely of the longitudinal axis of the vehicle. The ends 18 of the bar 12 are connected to the suspension arms 20 by means of bushings, ball joints or other similar means 26 which will permit relative pivotal movement therebetween, as the suspension arm 20 moves upwards and downwards.

The anti-roll bar 12 is mounted to a pair of frame members 23 at opposite ends of the cross beam 24 by means of a pair of bearing assemblies 30, the bearing assemblies 30 engaging the longitudinally extended end portions 16 of the bar 12 on a common axis transverse to t he longitudinal axis of the vehicle, one bearing assembly 30 at either end of the cross beam 24.

In order to accommodate tolerance variations in the build of the cross beam 24, the bearing assemblies 30 are preferably provided with means for transverse adjustment.

Figure 2:
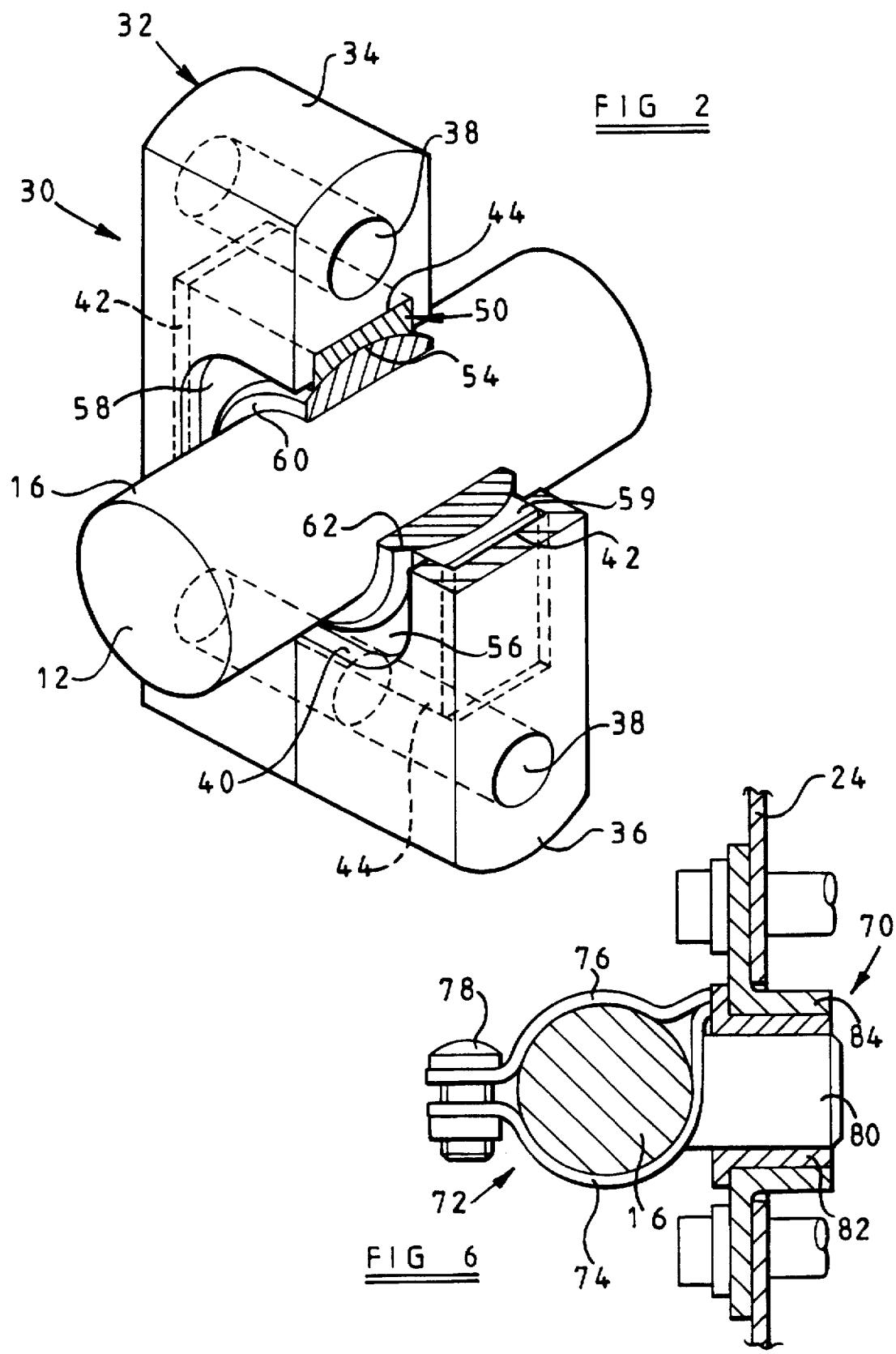
FIG. 2 is a sectional isometric view of a spherical bearing assembly used in the assembly illustrated in FIG. 1.

As illustrated in greater detail in FIG. 2, the bearing assemblies 30 comprise a two-part housing 32, the parts 34 and 36 of the housing 32 being clamped together and to the cross beam 24, by means of a pair of bolts which engage through holes 38 in the parts 34 and 36. A housing 32 defines a central aperture 40 of square configuration with rounded corners. Square grooves 42, 44 are provided in the edges of the housing 32 defining the aperture 40. The grooves 42 in the edges of the housing defining the sides of aperture 40 perpendicular to the holes 38, are deeper than the grooves 44 lying parallel to the holes 38.

A bearing block 50 of square section is located in the grooves 42 and 44, the bearing block 50 slidably engaging the bases of grooves 44, the deeper grooves 42 permitting the bearing block 50 to move transversely to the longitudinal axis of the vehicle. Preferably, the grooves 42 permit up to 6 mm of movement of the bearing block 50 from one extreme to the other, in order to accommodate tolerance build-up of ±3 mm in the build of the cross beam 24.

The bearing block 50 is made of glass reinforced nylon and defines a part spherical bearing aperture 54. The bearing block 50 is formed in two halves 56, 58, the halves being assembled together with the split 59 parallel to the bases of grooves 44.

A collar 60 is secured on each of the longitudinally extending end portions 16 of the bar 12 intermediate of their connection to the suspension arms 20 and the central portion 14. The outer diameter of the collar 60 defines a part spherical bearing formation 62 which corresponds to the bearing aperture 54 of the bearing block 50. The collar 60 is located longitudinally of the end portion 16 of the bar 12 in any suitable manner, for example by swaging, heat shrinking or bonding.

The spherical bearing formations 62 will thus permit the anti-roll bar 12 to pivot around the common axis of the bearing assemblies 30, from the full bump position shown in dashed line in FIG. 1 to the full rebound position illustrated in broken line in FIG. 1, when the suspension arms 20 on either side of the vehicle move upwardly and downwardly together, thus permitting full movement of the vehicle suspension. However, when one suspension arm 20 moves relative to the other, the torsional rigidity of the bar 12 and reaction of the forces at the bearing assemblies 30, will oppose relative movement of the suspensions arms 20, thereby reducing roll of the vehicle.

Figure 3:
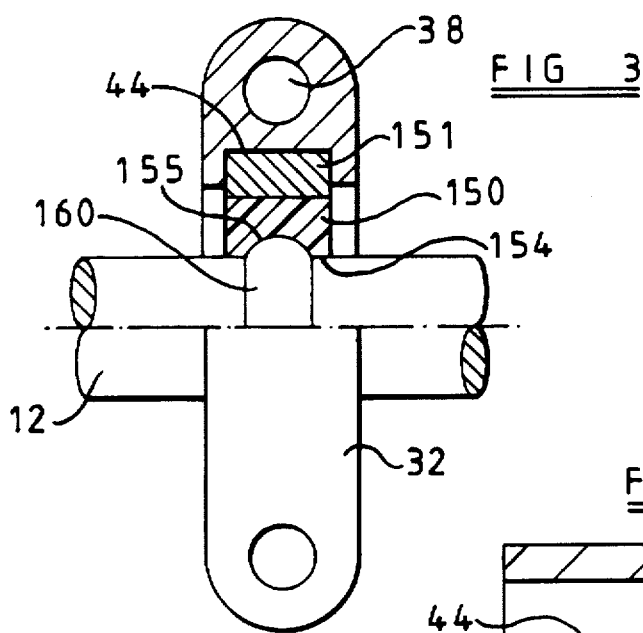
FIG. 3 shows a sectional side elevation of a modification to the bearing illustrated in FIG. 2.
Figure 4:
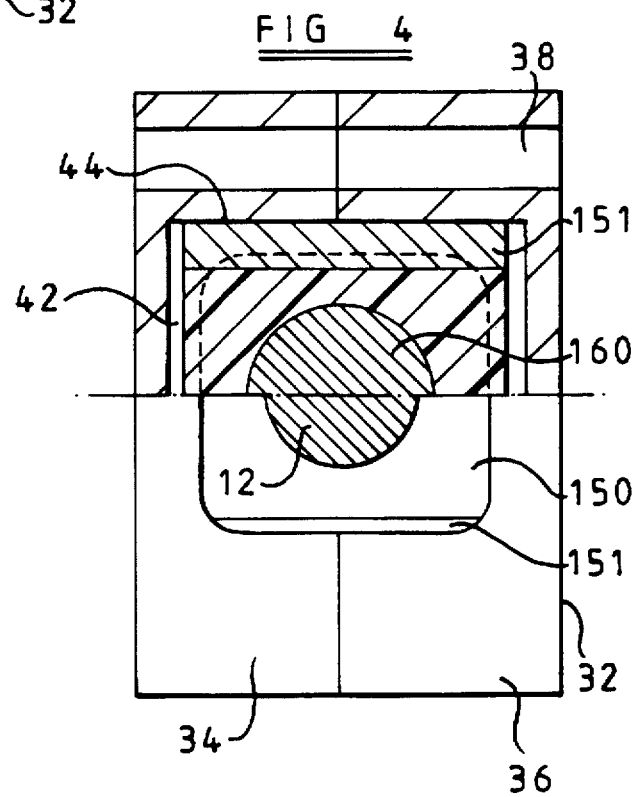
FIG. 4 shows a part sectional front elevation of the bearing assembly illustrated in FIG. 3.

In the modification illustrated in FIGS. 3 and 4, the nylon block 50 is replaced by an elastomeric bushing 150. The elastomeric bushing 150 has a pair of nylon inserts 151, each insert 151 being secured to an opposite edge of the elastomeric bushing 150. The nylon inserts 151 engage in the grooves 44 on the two-part housing 32, to permit sliding of the elastomeric bushing 150 transversely of the longitudinal axis of the vehicle.

The elastomeric bushing 150 defines a bearing aperture 154 which engages about the anti-roll bar 12. An upset portion 160 on the anti-roll bar 12 engages an arcuate recess 155 on the internal diameter of the bearing aperture 154, to locate the bearing assembly 30 longitudinally of the anti-roll bar 12.

The elastomeric bushing 150 is designed to permit relatively free pivoting of the anti-roll bar in the bearing assembly 30, as the two sides of the suspension move upwards and downwards together. Such pivoting movement is permitted by differential compression of the two sides of the bushing 150, that is the upper part of a first side and the lower part of a second side of the bushing 150 will be in compression while the lower part of the first side and the upper part of the second side of the bushing 150 are in extension. The bushing 150 will however oppose parallel movement of the anti-roll bar 12 in the bearing assembly 30, when the two sides of the suspension move relative to one another. Rigid plastics or metal reinforcing elements may be embedded in the elastomeric bushing 150, in order to provide the desired characteristics.

While in the above embodiment nylon inserts are provided on the elastomeric bushing 150 for sliding engagement in the housing 32, any suitable rigid plastics or metal inserts may be used.

Figure 5:
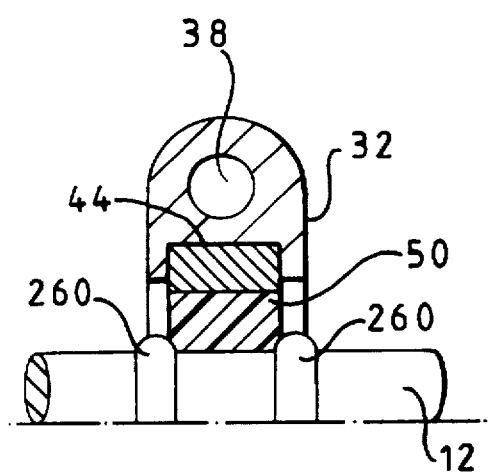
FIG. 5 illustrates a modification to the bearing assembly illustrated in FIG. 3.

In accordance with a further modification illustrated in FIG. 5, the elastomeric bushing 150 may be located longitudinally of the anti-roll bar 12 between a pair of upset portions 260, the upset portions 260 being spaced axially of one another.

In the modification illustrated in FIG. 6, a bearing assembly 70 is clamped to each of the longitudinally extending portions 16 of the bar 12, by means of a clamping assembly 72 comprising a pair of shells 74, 76 which are clamped together by means of bolts 78. A spigot 80 is secured to the clamping assembly 72, so that it extends transversely to the axis of the bar 12. The spigot 80 is pivotally located in a bushing 82 which in turn is mounted by means of a housing 84 to the cross beam 24 of the vehicle. In similar manner to the bearing assemblies 30 described above, the bearing assemblies 70 on either side of the vehicle are mounted on the cross beam 24, so that the spigots 80 have a common axis of rotation transverse to the longitudinal axis of the vehicle. The bearing assemblies 70 will thereby permit pivoting of the anti-roll bar 12 about the transverse axis, as the suspension arms 20 move upwardly and downwardly together and will oppose relative movement of the suspension arms 20 in similar manner to the bearing assemblies 30 disclosed above. Axial movement of the spigots 80 in the bushinges 82 will also accommodate transverse tolerance variations in the build of the cross beam 24.

The foregoing description presents several alternative embodiments of the present invention. Details of construction have been shown and described for purposes of illustration rather than limitation. Modifications and alterations of the invention will no doubt occur to those skilled in the art that will come within the scope and spirit of the following claims.

We claim:

1. An anti-roll bar assembly for a motor vehicle having a longitudinal axis, first wheel and second wheels mounted to a common axle transverse to the longitudinal axis, and a pair of frame members parallel to the longitudinal axis, the anti-roll bar assembly comprising:

an anti-roll bar having a central portion interconnecting first and second end portions which extend substantially longitudinal of the motor vehicle and having first and second free ends connected to said first and second wheels, respectively;

a first bearing assembly mounting said anti-roll bar to the first frame member intermediate said first end and said central portion; and a second bearing assembly mounting said anti-roll bar to the second frame member intermediate said second free end and said central portion of rotation, said first and second bearing assemblies having a common axis of rotation transverse to the longitudinal axis of the motor vehicle.

2. An anti-roll bar assembly according to claim 1, wherein said first and second bearing assemblies are adjustable transverse of the longitudinal axis of the motor vehicle.

3. An anti-roll bar assembly as defined in claim 2, wherein said first and second bearing assemblies include first and second spherical bearing, respectively.

4. An anti-roll bar assembly as defined in claim 3, wherein each of said first and second bearing assemblies further comprise:

a housing; and a bearing block mounted, within said housing, said bearing block being slidable with respect to said housing transverse to the longitudinal axis of the motor vehicle.

5. An anti-roll bar assembly according to claim 4, wherein said housing further comprises first and second parts, clamped together and secured to a support structure of the motor vehicle to define a central aperture, the edges defining a central aperture in said housing, said central aperture being grooved to slideably receive said bearing block therein.

6. An anti-roll bar assembly according to claim 4, wherein said bearing block includes said central aperture being partially spherical.

7. An anti-roll bar according to claim 6, wherein each of said first and second bearing assemblies further comprise:

first and second collars disposed on said anti-roll bar intermediate of said first and second free ends, respectively, and said central portion of said anti-roll bar, said first and second collars each having a spherical bearing surface for mating engagement with said central bearing aperture.

8. An anti-roll bar assembly according to claim 1, wherein said first and second bearing assemblies include first and second elastomeric bushings, respectively.

9. An anti-roll bar assembly according to claim 8, wherein said first and second bearing assemblies further comprise rigid inserts slidably disposed between said housing of each of said first and second bearing assemblies and said first and second elastomeric bushings to allow adjustment transverse to the longitudinal axis of the vehicle.

10. An anti-roll bar assembly according to claim 1, wherein each of said first and second bearing assemblies further comprise:

first and second bearing formations mounted to a support structure of the motor vehicle; and first and second spigots disposed on said first and second free end portions of said anti-roll bar, respectively; said first and second spigots extending transverse to the longitudinal axis of the motor vehicle and rotatably engaged with said bearing formations.

11. An anti-roll bar assembly according to claim 10, wherein said spigot of each of said first and second bearing assemblies mounted, respectively, on each of said first and second free end portions of said anti-roll bar so as to form a common axis of rotation transverse to the longitudinal axis of the vehicle.

12. An anti-roll bar assembly according to claim 10, wherein said first spigot slideably engaged with said bearing formation in a direction transverse to the longitudinal axis of the motor vehicle.

* * * * *